United States Patent [19]

Tayloe et al.

[11] Patent Number: 5,146,609
[45] Date of Patent: Sep. 8, 1992

[54] CELLULAR RADIO SYSTEM HAVING REDUCED HANDOVER DISRUPTION AND METHOD FOR USE IN SUCH A SYSTEM

[75] Inventors: Daniel R. Tayloe, Arlington Heights; Michael D. Kotzin, Buffalo Grove, both of Ill.

[73] Assignee: Motorola, Inc., Schaumburg, Ill.

[21] Appl. No.: 486,049

[22] Filed: Feb. 27, 1990

[51] Int. Cl.$^5$ .......................... H04Q 7/00; H04B 1/00
[52] U.S. Cl. .................................. 455/33.2; 455/54.2; 455/63
[58] Field of Search ...................... 455/33, 54, 63, 166, 455/34; 379/59, 60, 63

[56] References Cited
U.S. PATENT DOCUMENTS 4,829,554  5/1989  Barnes ................................. 455/33
4,868,891  9/1989  Ide ...................................... 455/161

Primary Examiner—Curtis Kuntz
Assistant Examiner—Christine Belzer
Attorney, Agent, or Firm—Val Jean F. Hillman

[57] ABSTRACT

A handover technique in a cellular radio communication system (100) for handing over a radio (102) from a first channel in a first cell to a second channel in a second cell, the technique comprising generating a fill-in message extrapolated from a message of the radio on the first channel and communicating the fill-in message when the radio has ceased communicating on the first channel; and terminating the fill-in message when the radio begins communicating on the second channel, thereby reducing handover disruption. The messages may be digitized audio messages. A timer (110, 118) may be employed to allow the fill-in message to terminate at substantially the same time as the radio begins communicating on the second channel. Alternatively, the fill-in message may be directly terminated (FIG. 2) in response to the radio beginning to communicate on the second channel. If the messages are data messages, no fill-in message is generated and the handover is completed directly (FIG. 2) in response to the radio beginning to communicate on the second channel.

20 Claims, 2 Drawing Sheets

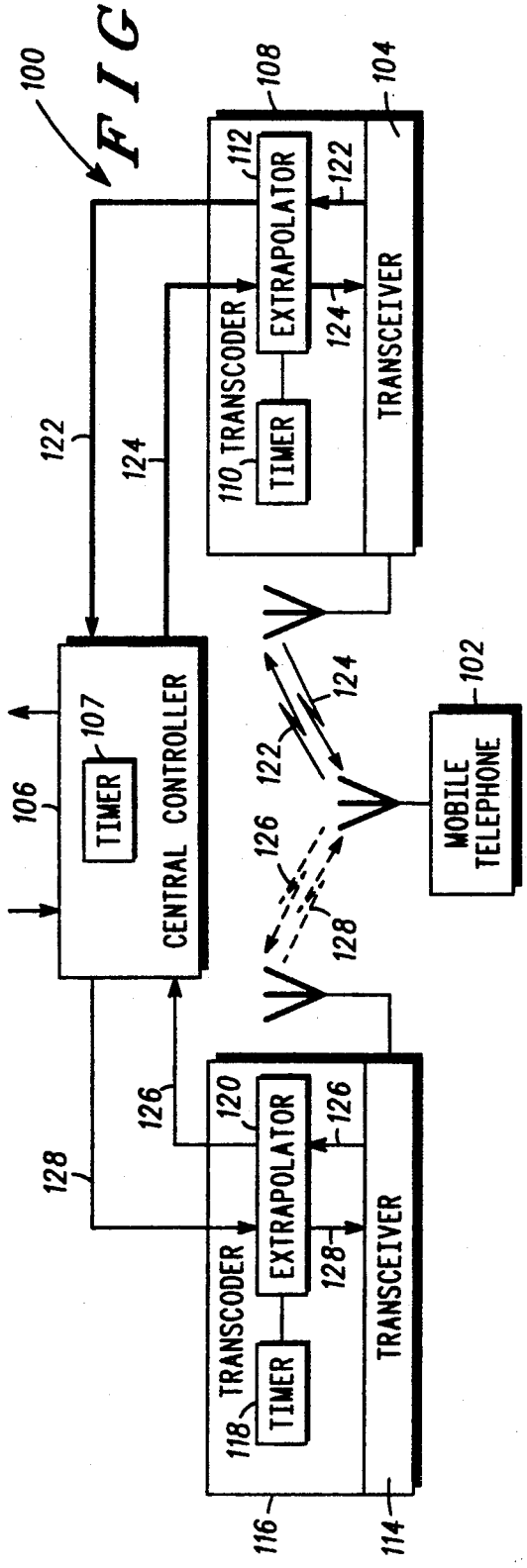
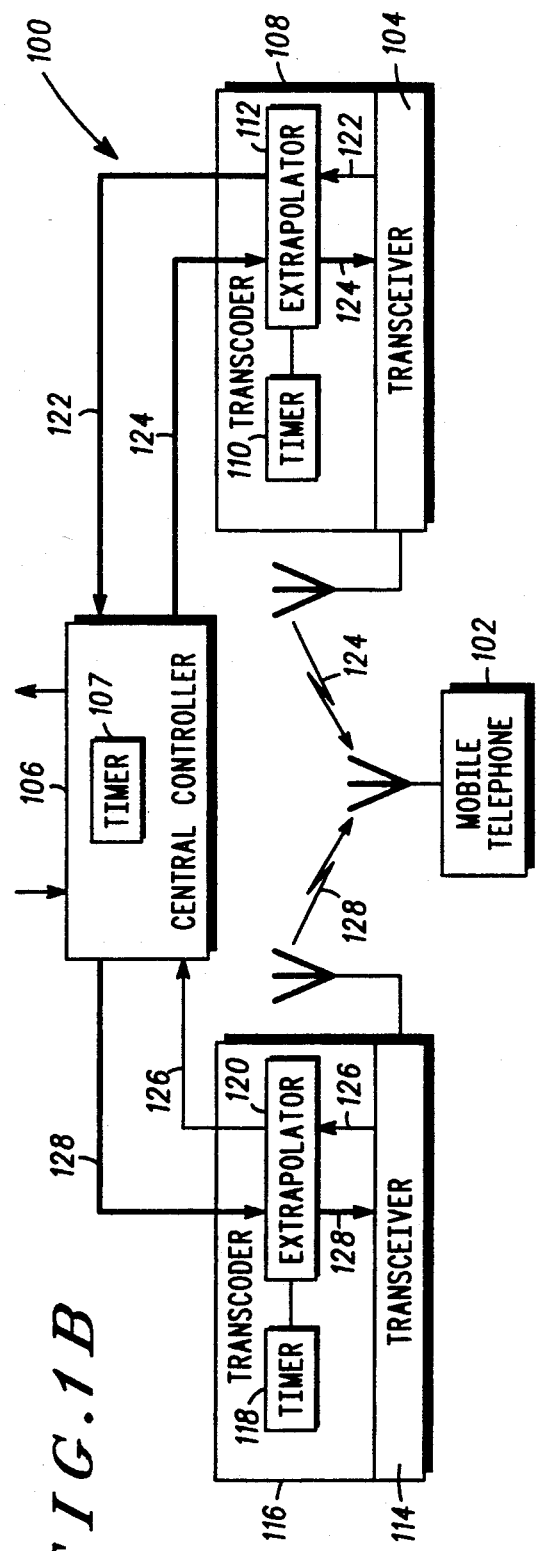

CELLULAR RADIO SYSTEM HAVING REDUCED HANDOVER DISRUPTION AND METHOD FOR USE IN SUCH A SYSTEM

BACKGROUND OF THE INVENTION

This invention relates to cellular radio systems.

In a typical known cellular radio system a mobile radio unit in a cell communicates via a radio channel with the cell's base station, which in turn communicates with a fixed, land-based switch connected to the land-line telephone system. When the mobile radio unit moves from one cell to another adjacent cell, a handover must be performed, in which the mobile ceases communicating with the old cell's base station on a first channel and begins communicating with the new cell's base station on a second, different channel. This handover process causes a disruption in communication to and from the mobile unit. This disruption is normally experienced in the form of an audio mute. Since the background noise is often quite high in a mobile environment, a mute is usually quite obvious. The coverage area of cellular radio systems heretofore has been such that the cell size has been sufficiently large to produce only occasional mutes which are not objectionable to most users. However, as cells shrink in size (as they are expected to do with digital cellular radio systems) handovers will occur much more frequently and the consequent mutes will become proportionately more disruptive to communication.

In existing digital cellular systems it is known to employ a "fill-in" function in the event of missing speech blocks or as a result of decoding errors or "stolen" speech blocks used for data. In such a known system a "fill-in" audio signal is extrapolated (using one of a variety of, known algorithms) from an immediately preceding audio signal for a period of up to some 320 milliseconds to fill in for missing audio.

SUMMARY OF THE INVENTION

It is an object of the present invention to provide an improved cellular radio system and method for use in such a system wherein handover disruption may be reduced.

In one preferred form there is provided audio handover means in a cellular radio communication system covering a plurality of cells and having a plurality of base station radios each serving a respective cell, a population of user radios which may communicate on radio channels with the plurality of base station radios in the plurality of cells, and a central controller linked to the plurality of base station radios for communicating messages between the central controller and the population of user radios, the handover means causing one of the user radios to cease communicating on a first channel in a first cell and to begin communicating on a second channel in a second cell adjacent the first cell, the handover means comprising:

fill-in means for generating a fill-in message extrapolated from a message of the one of the user radios on the first channel and for communicating the fill-in message when the one of the user radios has ceased communicating on the first channel;

validating means, responsive to signals on the second channel, for detecting when the one of the user radios begins communicating on the second channel; and terminating, responsive to the validating means, means for terminating the fill-in message when the one of the user radios begins communicating on the second channel, thereby reducing handover disruption.

The fill-in messages may be digitized audio messages. The terminating means may employ a timer to allow the fill-in message to terminate at substantially the same time as the one of the user radios begins communicating on the second channel. Alternatively, the fill-in message may be directly terminated in response to the one of the user radios beginning to communicate on the second channel.

In another preferred form there is provided data handover means in a cellular radio communication system covering a plurality of cells and having a plurality of base station radios each serving a respective cell, a population of user radios which may communicate on radio channels with the plurality of base station radios in the plurality of cells, and a central controller linked to the plurality of base station radios for communicating messages between the central controller and the population of user radios, the handover means causing one of the user radios to cease communicating on a first channel in a first cell and to begin communicating on a second channel in a second cell adjacent the first cell, the handover means comprising:

means for generating and transmitting to the central controller a control signal when the one of the user radios is not validly communicating a message on the second channel in the second cell; and terminating means for terminating the control signal and for transmitting to the central controller message information from the one of the user radios when the one of the user transceivers begins validly communicating a message on the second channel in the second cell.

BRIEF DESCRIPTION OF THE DRAWINGS

Two cellular radio systems, and methods for controlling handovers therein so as to reduce handover disruption, in accordance with the present invention will now be described, by way of example only, with reference to the accompanying drawings, in which:

FIGS. 1(a), 1(b) and 1(c) are schematic block diagrams of part of a first cellular radio system showing communication paths used prior to, during, and after a handover.

DESCRIPTION OF THE PREFERRED EMBODIMENT

Figure 1C:
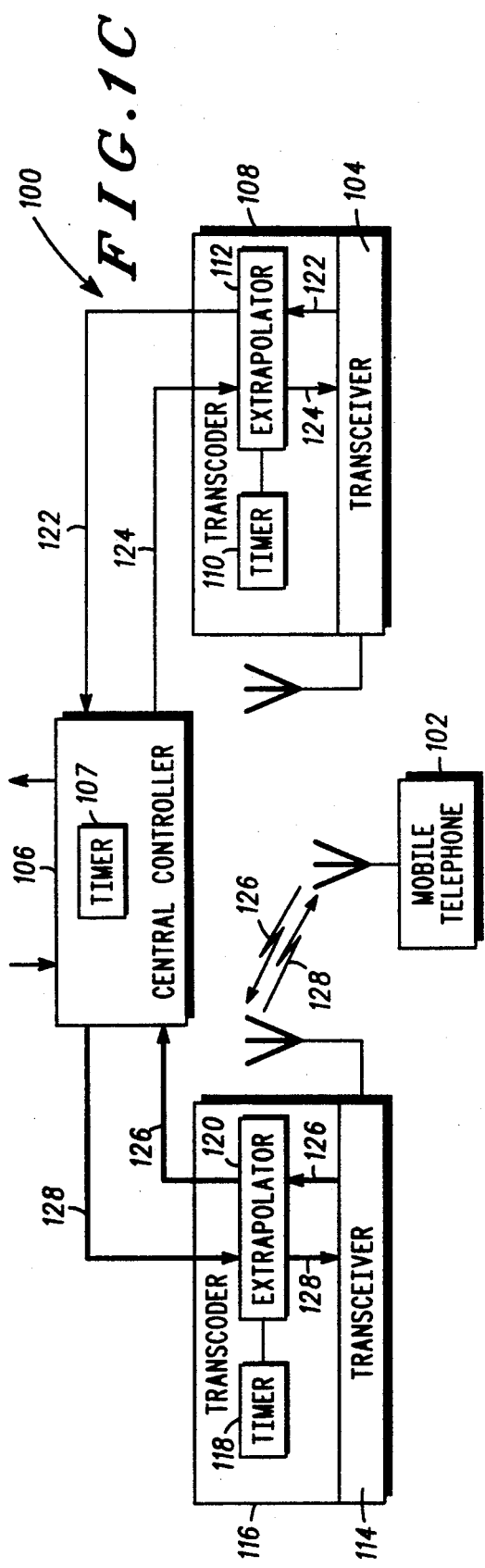

Referring now to FIG. 1(a), a first digital cellular radio telephone system 100 supports a population of cellular radio telephones, such as mobile cellular radio telephone 102, which can move in and between cells of the system. A first cell of the system has a base terminal radio transceiver 104 which transmits radio messages to and receives radio messages from cellular radio telephones (such as mobile radio telephone 102) in its cell, on predetermined radio channels under the control of a central controller 106, including a timer 107. The base terminal radio transceiver 104 communicates its cell's messages to and from the central controller 106 via an associated transcoder 108 (which may take the form of a conventional digital signal processor or DSP) which performs the necessary encoding and decoding (such as interleaving/de-interleaving, time-division multiplexing/de-multiplexing, convolutional coding/decoding, bit-rate conversion, etc.) to allow the first cell's messages to be satisfactorily carried between the central controller 106 and the base terminal radio transceiver 104. The transcoder 108 is provided with a timer 110 and an extrapolator 112, whose function will be described hereafter.

A second cell of the system has a base terminal radio transceiver 114 which transmits radio messages to and receives radio messages from cellular radio telephones (such as mobile radio telephone 102) in its cell, on predetermined radio channels under the control of the central controller 106. Like the base terminal radio transceiver 104, the base terminal radio transceiver 114 communicates its cell's messages to and from the central controller 106 via an associated transcoder 116, analogous to the transcoder 108 associated with the base terminal radio transceiver 104 in the first cell. The transcoder 116 is provided with a timer 118 and an extrapolator 120. The central controller 106 communicates messages from radio telephones in the first and second cells and a switching center (not shown) connecting to a land-line telephone system (also not shown). Audio messages are transmitted in digitized form between the mobile radio telephone 102 and the base terminal transceivers 104 and 114 to provide better audio quality.

When the mobile radio telephone 102 is exclusively in the first cell and is in use, audio messages are transmitted from the mobile radio telephone 102 to the base terminal radio transceiver 104 and from the base terminal radio transceiver 104 (via the transcoder 108) to the central controller 106 along path 122. At the same time, audio messages are transmitted from the base terminal radio transceiver 104 to the mobile radio telephone 102 and from the central controller 106 (via the transcoder 108) to the base terminal radio transceiver 104 along path 124. The audio messages between the mobile radio telephone and the base terminal radio transceiver 104 are carried in duplex on the same radio channel, assigned under the control of the central controller 106. When the mobile radio telephone 102 moves out of the first cell and into the second cell, its audio messages are switched, under the control of the central controller 106, so that audio messages are transmitted from the mobile radio telephone 102 to the base terminal radio transceiver 114 and from the base terminal radio transceiver 114 (via the transcoder 116) to the central controller 106 along path 126, and audio messages are transmitted from the base terminal radio transceiver 114 to the mobile radio telephone 102 and from the central controller 106 (via the transcoder 116) to the base terminal radio transceiver 114 along path 128. The audio messages between the mobile radio telephone 102 and the base terminal radio transceiver 114 are carried in duplex on the same radio channel, assigned under the control of the central controller 106. The radio channel used for the audio messages of the mobile radio telephone 102 in the first cell is different from the radio channel used for the audio messages of the mobile radio telephone 102 in the second cell.

Handover of the mobile radio telephone 102 from the first cell to the second cell is achieved in the following manner. When the mobile radio telephone 102 is in the first cell and begins to move out of the first cell towards the second cell, the central controller 106 commands the mobile radio telephone 102 to cease transmitting on the first channel. At the same time the central controller 106 also sets up a three-party "conference" call for audio messages to the mobile 102 by switching audio messages from the central controller to the mobile radio telephone so that the messages are transmitted both by the base terminal transceiver 104 on the first channel in the first cell and by the base terminal transceiver 114 on the second channel in the second cell. The central controller 106 at the same time also commands the transcoder 108 associated with the base terminal transceiver 104 in the first cell to start the timer 110, and to generate and transmit to the central controller 106, in place of audio messages from the mobile radio telephone 102, fill-in audio extrapolated from the audio messages most recently received from the mobile radio telephone 102. The fill-in audio messages are generated digitally from the digitized audio most recently received from the radio telephone 102 on the first channel. The generation of predicted audio fill-in messages is well known and understood by those skilled in the art and need not be described in further detail. The mobile radio telephone immediately initiates a procedure of "handshaking" with the base terminal transceiver 114 in the second cell in order to validate its presence in the second cell, but no audio path from the mobile radio telephone is yet established. This condition is shown in FIG. 1(b).

The mobile radio telephone 102 continues to move out of the first cell and enters the second cell. On completion of the "handshake" validation procedure, the mobile radio telephone 102 begins transmitting its audio messages in the second cell on the second channel and these are communicated to the central controller 106 along the path 126. "Handshake" validation procedures are well known and understood by those skilled in the art and need not be described in further detail. The transcoder 108 continues to generate and transmit fill-in audio until the timer 110 reaches a predetermined count, at which time the fill-in audio message is terminated. The central controller 106 then terminates the three-party "conference" call for audio messages from the central controller 106 to the mobile radio telephone 102, leaving audio messages between the mobile radio telephone 102 and the central controller 106 supported only on the second channel in the second cell along the paths 126 and 128. This condition is shown in FIG. 1(c).

The predetermined value to which the timer 110 is allowed to count before the fill-in audio is terminated is chosen so that the fill-in audio is terminated only after the mobile radio telephone 102 begins transmitting its audio messages on the second channel in the second cell, so as to avoid a gap between the end of fill-in audio and audio transmitted from the mobile radio telephone 102 on the second channel in the second cell.

It will be appreciated that in this way the party being called from the mobile radio telephone 102 perceives little or no disruption in audio messages from the mobile radio telephone 102, since the called party will receive fill-in predicted audio during the time the handover is occurring and will receive new audio when the handover has been completed.

It will be appreciated that if the audio path switch is timed (e.g. controlled by the timer 107 in the central controller) and can be made to occur at substantially the same time as new audio is transmitted on the second channel in the second cell, the three-party "conference" call used in the above example may be eliminated.

In an alternative method to that described above of operating the first cellular radio system, handover of the mobile radio telephone 102 from the first cell to the second cell is achieved in the following manner. When the mobile radio telephone 102 is in the first cell and begins to move out of the first cell towards the second cell, the central controller 106 commands the mobile radio telephone 102 to cease transmitting on the first channel. At the same time the central controller 106 also commands the transcoder 108 associated with the base terminal transceiver 104 in the first cell to generate and transmit to the central controller 106, in place of audio messages from the mobile radio telephone 102, fill-in messages extrapolated from the audio messages most recently received from the mobile radio telephone 102. In this alternative method of operation, the central controller 106 does not set up a three-party "conference" connection, nor does it initiate the timer 110 in the transcoder 108.

The mobile radio telephone 102 continues to move out of the first cell and enters the second cell. The mobile radio telephone initiates a procedure of "handshaking" with the base terminal transceiver 114 in the second cell in order to validate its presence in the second cell. The initiation of this "handshake" validation procedure is communicated to the central controller 106, which then initiates the timer 107 in the central controller 106. On completion of the "handshake" validation procedure, the mobile radio telephone 102 begins transmitting its audio messages in the second cell on the second channel and these are communicated to the central controller 106 along the path 126. Meanwhile, the transcoder 108 generates and transmits fill-in audio. When the timer 107 reaches a predetermined count, the central controller 106 then completes the handover switching at that time, and terminates the fill-in audio generated by the transcoder 108, leaving audio messages between the mobile radio telephone 102 and the central controller 106 supported only on the second channel in the second cell along the paths 126 and 128.

The predetermined value to which the timer 107 is allowed to count, in this alternative method of operation, before the fill-in audio is terminated is less than that for the transcoder timer 110 in the method of operation described above since the central controller timer 107 is now initiated later than was the transcoder timer 110. This later initiation of the central controller timer 107 allows the much more reliable prediction of the remaining interval of time before the mobile radio telephone 102 begins transmitting its audio messages on the second channel in the second cell, since this is now simply the time between initiation of the "handshake" validation procedure and the initiation of true audio transmission. Thus, it will be appreciated that this alternative method of handover affords more reliable reduction of handover disruption.

Figure 2:
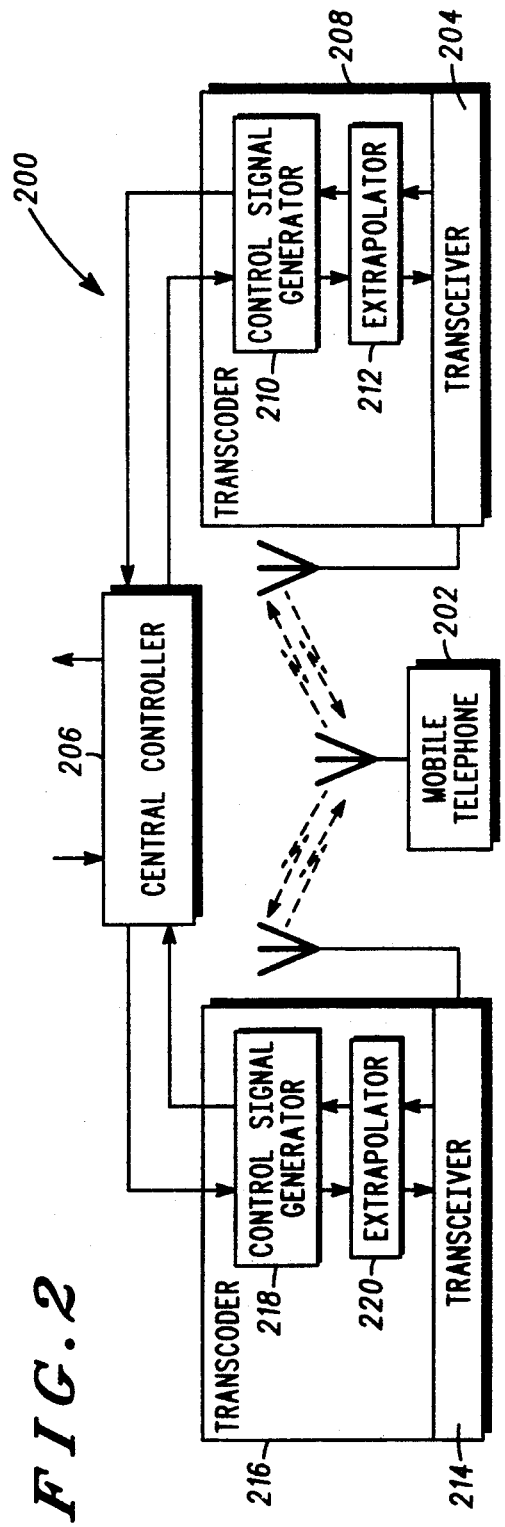
FIG. 2 is a schematic block diagram of part of a second cellular radio system showing communication paths used prior to, during, and after a handover.

Referring now to FIG. 2, a second digital cellular radio telephone system 200 supports a population of cellular radio telephones, such as mobile cellular radio telephone 202, which can move in and between cells of the system. A first cell of the system has a base terminal radio transceiver 204 which transmits radio messages to and receives radio messages from cellular radio telephones (such as mobile radio telephone 202) in its cell, on predetermined radio channels under the control of a central controller 206. The base terminal radio transceiver 204 communicates its cell's messages to and from the central controller 206 via an associated transcoder 208 (which may take the form of a conventional digital signal processor or DSP) which performs the necessary endcoding and decoding to allow the first cell's messages to be satisfactorily carried between the central controller 206 and the base terminal radio transceiver 204. The transcoder 208 is provided with a control signal generator 210 and an extrapolator 212, whose function will be described hereafter A second cell of the system has a base terminal radio transceiver 214 which transmits radio messages to and receives radio messages from cellular radio telephones (such as mobile radio telephone 202) in its cell, on predetermined radio channels under the control of the central controller 206. Like the base terminal radio transceiver 204, the base terminal radio transceiver 214 communicates its cell's messages to and from the central controller 206 via an associated transcoder 216, analogous to the transcoder 208 associated with the base terminal radio transceiver 204 in the first cell. The transcoder 216 is provided with a control signal generator 218 and an extrapolator 220. The central controller 206 communicates messages from radio telephones in the first and second cells and a switching center (not shown) connecting to a land-line telephone system (also not shown). Audio messages are transmitted in digitized form between the mobile radio telephone 202 and the base terminal transceivers 204 and 214 to provide better audio quality.

When the mobile radio telephone 202 is exclusively in the first cell and is in use, audio messages are transmitted from the mobile radio telephone 202 to the base terminal radio transceiver 204 and from the base terminal radio transceiver 204 (via the transcoder 208) to the central controller 206. At the same time, audio messages are transmitted from the base terminal radio transceiver 204 to the mobile radio telephone 202 and from the central controller 206 (via the transcoder 208) to the base terminal radio transceiver 204. The audio messages between the mobile radio telephone and the base terminal radio transceiver 204 are carried in duplex on the same radio channel, assigned under the control of the central controller 206. When the mobile radio telephone 202 moves out of the first cell and into the second cell, its audio messages are switched, under the control of the central controller 206, so that audio messages are transmitted from the mobile radio telephone 202 to the base terminal radio transceiver 214 and from the base terminal radio transceiver 214 (via the transcoder 216) to the central controller 206, and audio messages are transmitted from the base terminal radio transceiver 214 to the mobile radio telephone 202 and from the central controller 206 (via the transcoder 216) to the base terminal radio transceiver 214. The audio messages between the mobile radio telephone 202 and the base terminal radio transceiver 204 are carried in duplex on the same radio channel, assigned under the control of the central controller 206. The radio channel used for the audio messages of the mobile radio telephone 202 in the first cell is different from the radio channel used for the audio messages of the mobile radio telephone 202 in the second cell.

Handover of the mobile radio telephone 202 from the first cell to the second cell is achieved in the following manner. When the mobile radio telephone 202 is in the first cell and begins to move out of the first cell towards the second cell, the central controller 206 commands the mobile radio telephone 202 to cease transmitting on the first channel. At the same time the central controller 206 also switches audio messages to the mobile 202 so that the messages are transmitted both by the base terminal transceiver 204 on the first channel in the first cell and by the base terminal transceiver 214 on the second channel in the second cell. The central controller 206 at the same time also commands the transcoder 208 associated with the base terminal transceiver 204 in the first cell to generate and transmit to the central controller 206, in place of audio messages from the mobile radio telephone 202, fill-in audio extrapolated from the audio messages most recently received from the mobile radio telephone 202. Also at the same time the central controller 206 commands the code signal generator 218 in the transcoder 216 associated with the base terminal radio transceiver 214 to generate and transmit to the central controller 206 and predetermined code signal (e.g. a constant, known PCM value).

The mobile radio telephone 202 continues to move out of the first cell and enters the second cell. The mobile radio telephone initiates a procedure of "handshaking" with the base terminal transceiver 214 in the second cell in order to validate its presence in the second cell and, on completion of the "handshake" validation procedure, the mobile radio telephone 202 begins transmitting its audio messages in the second cell on the second channel. When the base terminal transceiver 214 receives audio messages on the second channel, it terminates the generation and transmission of the control signal by control signal generator and, in its place, communicates the received audio to the central controller 206. As soon as the central controller 206 begins to receive from the base terminal transceiver 214 audio instead of the control signal, it commands the extrapolator 212 in the transcoder 208 associated with the base terminal radio transceiver 204 to terminate the fill-in audio and completes the handover switch, leaving audio messages between the mobile radio telephone 202 and the central controller 206 supported only on the second channel in the second cell.

It will be appreciated that in the system of FIG. 2 high synchronicity of switching between fill-in and true audio is reliably achieved without dependence on timers and predetermined timing periods since the switching is directly responsive to the reception by the base terminal transceiver 214 of audio on the second channel in the second cell.

It will be appreciated that in this way the party being called from the mobile radio telephone 202 perceives little or no disruption in audio messages from the mobile radio telephone 202, since the called party will receive fill-in predicted audio during the time the handover is occurring and will receive new audio without significant delay when it is available.

As explained above, when the messages transmitted by the mobile radio telephone 202 are audio messages, during handover when "real" audio is missing the audio can be predicted by extrapolation to produce a fill-in audio signal which can be used in place of missing audio to minimize handover disruption. However, if the messages transmitted by the mobile radio telephone 202 are data messages, it is not possible satisfactorily to extrapolate or predict for missing audio during handover. In this case, the system of FIG. 2 is made to operate in an analogous manner to that described above, but during a handover from the first cell to the second cell the extrapolator 212 is not made to generate and transmit a fill-in signal. In all other respects the handover is conducted in the same manner as that described above, with the code signal generator 218 in the transcoder 216 generating and transmitting to the central controller 206 a control signal until the mobile radio telephone 202 begins transmitting messages on the second channel in the second cell. In this way handover disruption of data messages is minimized, since the transmission gap (during which the mobile radio telephone 202 does not transmit data while being handed over from the first cell to the second cell) is kept to a minimum.

It will be appreciated that although in the above examples the extrapolators 112, 120, 212 and 220 and the timers 110 and 118 have been described as being located within their associated respective transcoders, these components could alternatively be located at the respective central controller or at any other convenient location.

It will also be understood that the central controller 106 or 206 could be implemented in a conventional base site controller or mobile switching center, or its functions could be divided between a base site controller and a mobile switching center.

It will be appreciated that various other modifications or alternatives to the above described embodiment will be apparent to the man skilled in the art without departing from the inventive concept.

We claim:

1. In a cellular radio communication system covering a plurality of cells and having a plurality of base station radios each serving a respective cell, a population of user radios which may communicate on radio channels with the plurality of base station radios in the plurality of cells, and a central controller linked to the plurality of base station radios for communicating messages between the central controller and the population of user radios, handover means for causing one of the user radios to cease communicating on a first channel in a first cell and to begin communicating on a second channel in a second cell adjacent the first cell, the handover means comprising:

fill-in means for generating a fill-in message extrapolated from a message of the one of the user radios on the first channel and for communicating the fill-in message when the one of the user radios has ceased communicating on the first channel;

validating means, responsive to signals on the second channel, for validating when the one of the user radios begins communicating on the second channel in the second cell; and terminating means, responsive to the validating means, for terminating the fill-in message when the one of the user radios begins communicating on the second channel in the second cell, thereby reducing handover disruption.

2. A system according to claim 1 wherein the terminating means terminates the fill-in message after a predetermined time from when the one of the user radios ceases to communicate on the first channel so as to terminate the fill-in message at substantially the same time as the one of the user radios begins communicating on the second channel.

3. A system according to claim 1 wherein the one of the user radios includes means for validating its presence in the second cell with the base station of the second cell after entering the second cell and before communicating messages in the second cell, and the terminating means terminates the fill-in message after a predetermined time from when the one of the user radios begins validating its presence in the second cell so as to terminate the fill-in message at substantially the same time as the one of the user radios begins communicating on the second channel.

4. A system according to claim 1 wherein the base station radio of the second cell includes means for generating and transmitting to the central controller a control signal when the one of the user radios is not validly communicating a message on the second channel in the second cell, and the terminating means terminates the fill-in message in response to the cessation of the control signal when the one of the user transceivers begins validly communicating a message on the second channel in the second cell.

5. A system according to claim 1 wherein the messages are communicated digitally.

6. A system according to claim 1 wherein the fill-in message is generated digitally.

7. A system according to claim 1 wherein the handover means further comprises means for establishing during handover a multi-party call between a calling party and the first channel in the first cell and the second channel in the second cell.

8. A system according to claim 1 wherein the fill-in message is an audio message.

9. A system according to claim 8 wherein the fill-in means comprises a transcoder.

10. A system according to claim 1 wherein the cellular radio communication system is a cellular radio telephone system.

11. In a cellular radio communication system covering a plurality of cells and having a plurality of base station radios each serving a respective cell, a population of user radios which may communicate on radio channels with the plurality of base station radios in the plurality of cells, and a central controller linked to the plurality of base station radios for communicating messages between the central controller and the population of user radios, handover means for causing one of the user radios to cease communicating on a first channel in a first cell and to begin communicating on a second channel in a second cell adjacent the first cell, the handover means comprising:
  means for generating and transmitting to the central controller a fill-in message when the one of the user radios ceases communicating on the first channel in the first cell;
  validating means, responsive to signals on the second channel, for validating when the one of the user radios begins communicating on the second channel in the second cell; and
  terminating means, responsive to the validating means, for terminating the fill-in message and transmitting to the central controller message information from the one of the user radios when the one of the user radios begins validly communicating a message on the second channel in the second cell, thereby reducing handover disruption.

12. A system according to claim 11 wherein the message is a digital data message.

13. A system according to claim 11 wherein the means for generating and transmitting is a transcoder.

14. A system according to claim 11 wherein the cellular radio communication system is a cellular radio telephone system.

15. A method of handover from a first channel in a first cell to a second channel in a second cell in a cellular radio communication system covering a plurality of cells and having a plurality of base station radios each serving a respective cell, a population of user radios which may communicate on radio channels with the plurality of base station radios in the plurality of cells, and a central controller linked to the plurality of base station radio transceivers for communicating messages between the central controller and the population of user radios, the method comprising the steps of:
  generating a fill-in message extrapolated from the message of the one of the user radios on the first channel and communicating the fill-in message when the one of the user radios ceases communicating on the first channel in the first cell;
  validating when the one of the user radios begins communicating on the second channel in the second cell; and terminating the fill-in message when the one of the user radios begins communicating on the second channel, in the second cell, thereby reducing handover disruption.

16. A method according to claim 15 wherein the terminating means terminates the fill-in message after a predetermined time from when the one of the user radios ceases to communicate on the first channel so as to terminate the fill-in message at substantially the same time as the one of the user radios begins communicating on the second channel.

17. A method according to claim 15 wherein the one of the user radios validates its presence in the second cell with the base station radio of the second cell after entering the second cell and before communicating messages in the second cell, and the fill-in message is terminated after a predetermined time from when the one of the user radios begins validating its presence in the second cell so as to terminate the fill-in message at substantially the same time as the one of the user radios begins communicating on the second channel.

18. A method according to claim 15 wherein the fill-in message is an audio message.

19. A method of handover from a first channel in a first cell to a second channel in a second cell in a cellular radio communication system covering a plurality of cells and having a plurality of base station radios each serving a respective cell, a population of user radios which may communicate on radio channels with the plurality of base station radios in the plurality of cells, and a central controller linked to the plurality of base station radio transceivers for communicating messages between the central controller and the population of user radios, the method comprising the steps of:
  generating and transmitting to the central controller a control signal when the one of the user radios ceases communicating a message on the first channel in the first cell;
  generating a fill-in message extrapolated from the message of the one of the user radios on the first channel and communicating the fill-in message to the central controller when the one of the user radios ceases communicating on the first channel in the first cell; validating when the one of the user radios begins communicating on the second channel in the second cell; and
  terminating the control signal and the fill-in message and transmitting to the central controller message information from the one of the user radios when the one of the user radios begins validly communicating a message on the second channel in the second cell, thereby reducing handover disruption.

20. A method according to claim 19 wherein the fill-in message is a digital data message.

* * * * *